United States Patent [19]
Ogasawara et al.

[11] 4,001,097
[45] Jan. 4, 1977

[54] PROCESS FOR THE PREPARATION OF CURED OLIGOACRYLATES

[75] Inventors: Takahisa Ogasawara; Yoshimichi Senzaki; Hiroyuki Kato; Hidemaro Tatemichi, all of Nagoya, Japan

[73] Assignee: Toagosei Chemical Industrial Co. Ltd., Tokyo, Japan

[22] Filed: Aug. 29, 1974

[21] Appl. No.: 501,714

Related U.S. Application Data

[63] Continuation of Ser. No. 314,286, Dec. 12, 1972, abandoned.

[30] Foreign Application Priority Data

Dec. 16, 1971   Japan ............................ 46-101425

[52] U.S. Cl. .................... 204/159.16; 204/159.15; 204/159.19; 260/40 R; 260/861; 260/862; 260/872; 427/36; 427/38; 427/44
[51] Int. Cl.² .................... C08F 8/00; C08L 67/06; C08L 67/00
[58] Field of Search ................ 204/159.15, 159.19, 204/159.16

[56] References Cited

UNITED STATES PATENTS

| | | | |
|---|---|---|---|
| 3,169,945 | 2/1965 | Hostettler et al. | 260/78.3 |
| 3,455,801 | 7/1969 | D'Aleljo | 204/159.15 |
| 3,455,802 | 7/1969 | D'Aleljo | 204/159.15 |
| 3,483,151 | 12/1969 | Biarnais et al. | 260/76 |
| 3,631,154 | 12/1971 | Kawaguchi et al. | 260/76 |
| 3,700,643 | 10/1972 | Smith et al. | 204/159.15 |
| 3,741,937 | 6/1973 | Ehring et al. | 260/76 |

FOREIGN PATENTS OR APPLICATIONS

| | | | |
|---|---|---|---|
| 244,882 | 5/1960 | Australia | 260/76 |
| 1,165,622 | 10/1969 | United Kingdom | 260/76 |

*Primary Examiner*—Murray Tillman
*Assistant Examiner*—Thurman K. Page
*Attorney, Agent, or Firm*—Ladas, Parry, Von Gehr, Goldsmith & Deschamps

[57] ABSTRACT

Process for curing an oligoacrylate containing 3-6 acryloyl groups and at least one cyclohexene nucleus in the molecule and having an acryloyl group equivalent of not more than 1000, together with or without at least one other compound copolymerizable therewith, under the action of ionizing radiant rays in a molecular oxygen-containing gas to obtain a cured product from said oligoacrylate.

2 Claims, No Drawings

PROCESS FOR THE PREPARATION OF CURED OLIGOACRYLATES

This is a continuation, of application Ser. No. 314,286 filed Dec. 12, 1972, and now abandoned.

This invention relates to a process for the preparation of a cured oligoacrylate by curing either an oligoacrylate containing a cyclohexene nucleus in the molecule or a composition including the oligoacrylate in the atmosphere of a molecular oxygen-containing gas such as air and under the action of ionizing radiant rays. In this specification it is to be understood that an acrylate and methacrylate are meant by the term "(meth) acrylate", acrylic and methacrylic acids by the term "(meth) acrylic acid", and acryloyl and methacryloyl groups by the term "(meth) acryloyl group." It is known that vinyl group-containing compounds can be polymerized and cured owing to the presence of the vinyl groups under the action of ionizing radiant rays. In this case, however, the ionizing radiant rays are necessary to irradiate in the absence of the air or in an inert gas, and if the rays are irradiated in the presence of the air or other molecular oxygen-containing gases a product to be obtained will forever remain tacky at its parts in contact with the air or the like due to the polymerization inhibiting action of the oxygen, thereby making it usually impossible to obtain a cured product having a satisfactory surface state. Further, as is seen from U.S. Pat. Nos. 3,437,513 and 3,528,844 and the like, most of the heretofore proposed curable compositions contain a large proportion of low boiling monomers such as styrene, (meth)acrylic acid and lower alkyl esters thereof and acrylonitrile and, however, these low boiling monomers when coating and then curing the proposed compositions on a base material under the action of ionizing radiant rays, will evaporate and scatter thereby incurring a great loss thereof and causing a change in composition of the compositions, evolution of noxious and pungent vapors, generation of nasty smell and formation of detonating gases. These disadvantages will raise problems when said compositions are in practical use. Thus, the development of new processes has been desired for effecting an easy cure in the air without evolving undesirable vapors.

As a result of the studies made by the present inventors in an attempt to solve the problems mentioned above, it has been found that an oligoacrylate containing at least one cyclohexene nucleus and 3–6 acryloyl groups in the molecule (such oligoacrylate being hereinafter referred to simply as "cyclohexene-containing oligoacrylate") is not volatile and the cyclohexene-containing oligoacrylate is easily cured under the action of ionizing radiant rays in a molecular oxygen-containing gas, thereby accomplishing this invention.

As an example of conventional resin wherein a cyclohexene nucleus is introduced to the molecule to permit this resin to be cured in the air (air-curable), there is known to the art an unsaturated polyester resin curable at ambient temperatures in the air, prepared by dissolving a tetrahydrophthalic acid-modified unsaturated polyester resin in a vinylic monomer such as styrene to form a solution thereof, adding to the solution an organic peroxide and metallic soap and then curing the thus-added solution (see, for example, Shikizai Kyoki Journal 37, 165 (1964), Reports by Noma and Yosomiya; and Kobunshi 13, 419 (1964), Reports by Yosomiya and Noma). It is considered that an unsaturated polyester-type resin may be cured according to the following mechanism. A tetrahydrophthalic acid-modified unsaturated polyester, for example, is automatically oxidized with the air to produce on the cyclohexene nucleus hydroperoxides which are then decomposed by the catalytic action of metallic ion used thereby to form a thin film on the polymer surface portion which is in contact with the air, such film preventing the air from contacting with the polymer thereby effecting the cure of the polymer. As described above, although the air-curability of the unsaturated polyester-type resin in a catalytic system comprising an organic peroxide and metallic salt is known to the art, the air-curability thereof under the action of ionizing radiant rays is not disclosed.

Various oligo(meth)acrylates were subjected to the irradiation of electron rays at a dosage of 5 megarad in the air in the same manner as in Examples 1 – 15. The results are partly shown in Table 1, from which it is clearly seen that compounds which may be cured under the action of ionizing radiant rays in the air should firstly contain at least one cyclohexene ring in the molecule, secondly contain at least three acryloyl groups in the molecule and thirdly contain the acryloyl groups in certain limited amounts which will be detailed later.

Oligoacrylates which are widely varied in structure and molecular weight may be synthesized by selecting the kinds of raw materials used and the compositions thereof. As is seen from comparison examples 1 to 2 to be mentioned later, however, it has been confirmed that as the third condition for easy air-cure of the oligoacrylates, they should have an acryloyl group equivalent of not more than 1000, preferably 600. The term "(meth)acryloyl group equivalent" means a numeral value obtained by dividing the molecular weight of a (meth)acrylate by the number of (meth)acryloyl groups contained therein.

The oligo(meth)acrylates indicated by Nos. 1 to 8 in Table 1 are exemplary ones which contain at least three (meth) acryloyl groups (hereinafter referred to as "trivalent") in the molecule and a cyclohexene nucleus, Nos. 9 to 21 illustrate at least trivalent oligo(meth)acrylates containing no cyclohexene nucleus, Nos. 22 to 40 illustrate monovalent and divalent oligo(meth)acrylates containing a cyclohexene nucleus and Nos. 41 to 64 illustrate mono- and divalent oligo(meth)acrylates containing no cyclohexene nucleus.

As is clear from Table 1 wherein the symbols used in the structural formulae are explained later, the exemplary structural formulae of typical oligoacrylates which may be used are as follows.

Exemplary formula 1: $(A)_2 - T_p - T - T_p - (A)_2$ $CH_2=CH-CO-O-CH_2$
$CH_2=CH-CO-O-CH_2-C-CH_2-O-OC$
$C_2H_5$ $CH_2=CH-CO-O-CH_2$
$CH_2=CH-CO-O-CH_2-C-CH_2-O-OC$
$C_2H_5$

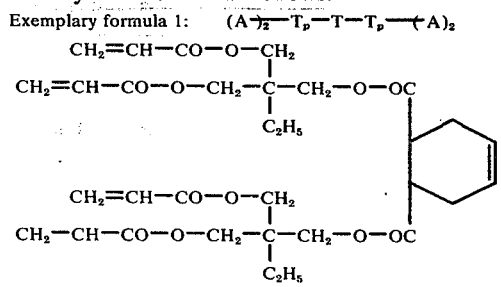

Exemplary formula 7: $C_H(E-A)_3$

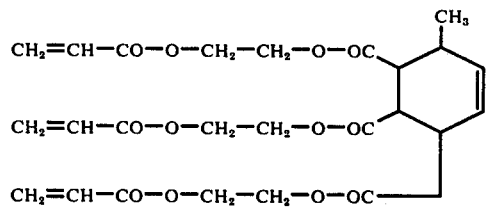

Exemplary formula 22: $A(E-T)_{\overline{n}}-E-A$

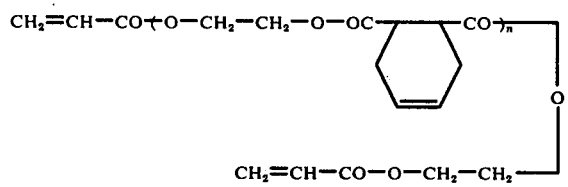

Exemplary formula 37: $A-E-T-OH$

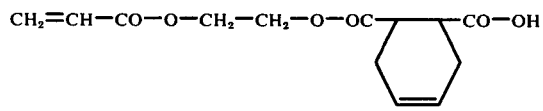

Exemplary formula 40: $A((Pr')_{\overline{n}}-O-T)_{\overline{m}}(Pr')_{\overline{n}}-OH$

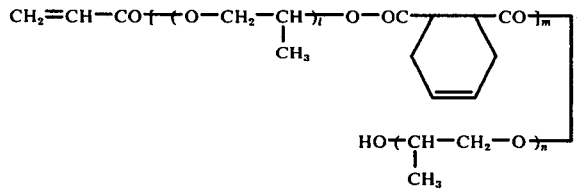

The symbols used in the structural formulae in Table 1 mean the following chemical structures, respectively.

| Symbols | | Structures |
|---|---|---|
| (Terminal group) | | |
| A | Acryloyl group | $CH_2\!=\!CH-CO-$ |
| M | Methacryloyl group | $CH_2\!=\!C(CH_3)-CO-$ |
| (Polybasic acid residue) | | |
| T | Tetrahydrophthalic acid residue | -OC—⬡—CO- |
| Hi | Himic acid residue | -OC—⬡(CH₂)—CO- |

-continued

| Symbols | | Structures |
|---|---|---|
| He | Het acid residue | —OC—C₆Cl₄(CCl₂)—CO— (hexachloro bridged cyclic structure with Cl substituents) |
| $C_H$ | 6-methyl-cyclohexene-4-1,2,3-tricarboxylic acid residue | cyclohexene ring with CH₃ and three —CO— groups |
| $P_m$ | Pyromellitic acid residue | benzene ring with four —CO— groups (1,2,4,5) |
| $T_m$ | Trimellitic acid residue | benzene ring with three —CO— groups |
| Ad | Adipic acid residue | —OC(CH₂)₄CO— |
| P | Phthalic acid residue | benzene ring with two ortho —CO— groups |
| Ml | Maleic acid residue | —OC—CH=CH—CO— |
| F | Fumaric acid residue | —OC—CH=CH—CO— |
| I | Itaconic acid residue | —OC—C(=CH₂)—CH₂—CO— |
| S | Succinic acid residue | —OC—CH₂—CH₂—CO— |
| $S_{Br}$ | Bromosuccinic acid residue | —OC—CH(Br)—CH₂—CO— |
| Se | Sebacic acid residue | —OC—(CH₂)₈—CO— |
| $P_{Cl}$ | Tetrachlorophthalic acid residue | benzene ring with 4 Cl and two —CO— groups |
| $P_{Br}$ | Tetrabromophthalic acid residue | benzene ring with 4 Br and two —CO— groups |
| Gm | α-methyleneglutaric acid residue | —OC—C(=CH₂)—CH₂—CH₂—CO— |

(Polyhydric alcohol residue)

| | | |
|---|---|---|
| $T_P$ | Trimethylolpropane residue | C(CH₂—O—)₃(C₂H₅) |
| G | Glycerine residue | —O—CH₂—CH(O—)—CH₂—O— |
| $H_T$ | 1,2,6-hexenetriol residue | —O—CH₂—CH(O—)(CH₂)₃CH₂—O— |

-continued

| Symbols | | Structures |
|---|---|---|
| Pe | Pentaerythritol residue | $-O-CH_2\text{ }\diagdown\text{ }CH_2-O-$ <br> $\text{ }\diagup\text{C}\diagdown$ <br> $-O-CH_2\text{ }\diagup\text{ }CH_2-O-$ |
| E | Ethylene glycol residue | $-O-CH_2-CH_2-O-$ |
| D | Diethylene glycol residue | $-O(CH_2-CH_2-O)_2$ |
| Tr | Triethylene glycol residue | $-O(CH_2-CH_2-O)_3$ |
| Pr | Propylene glycol residue | $-O-CH_2-CH(CH_3)-O-$ |
| Pr' | " | $-O-CH_2-CH(CH_3)-$ |
| D$_p$ | Dipropylene glycol residue | $-O(CH_2-CH(CH_3)-O)_2$ |
| B | 1,3-butanediol residue | $-O-CH_2-CH_2-CH(CH_3)-O-$ |
| N | Neopentyl glycol residue | $-O-CH_2-C(CH_3)_2-CH_2-O-$ |
| B$_p$ | Dioxypropyl bisphenol A | $-[O-CH_2-CH(CH_3)-O-\langle\text{phenyl}\rangle]_2 C(CH_3)_2$ |
| H | Hexanediol residue | $-O-CH_2(CH_2)_4CH_2-O-$ |

Table 1

| Preparation No. | Polybasic acid | Polyhydric alcohol | Terminal group | Number of terminal group | Structure of principal ingredient (standard compound) | (Meth)acryloyl group equivalent | State of cure obtained by electron ray irradiation |
|---|---|---|---|---|---|---|---|
| 1 | T | T$_p$ | A | 4 | $(A)_{\frac{1}{2}}T_p-T-T_p(A)_2$ | 155 | ◯ |
| 2 | T | G | A | 4 | $(A)_{\frac{1}{2}}G-T-G(A)_2$ | 135 | ◯ |
| 3 | T | H$_T$ | A | 4 | $(A)_{\frac{1}{2}}H_T-T-H_T(A)_2$ | 154 | ◯ |
| 4 | T | P$_e$ | A | 6 | $(A)_{\frac{1}{2}}P_e-T-P_e(A)_2$ | 122 | ◯ |
| 5 | H$_t$ | G | A | 4 | $(A)_{\frac{1}{2}}G-H_t-G(A)_2$ | 136 | ◯ |
| 6 | H$_e$ | T$_p$ | A | 4 | $(A)_{\frac{1}{2}}T_p-H_e-T_p(A)_2$ | 209 | ◯ |
| 7 | C$_H$ | E | A | 3 | $C_H(E-A)_3$ | 174 | ◯ |
| 8 | T | T$_p$ | M | 4 | $(M)_{\frac{1}{2}}T_p-T-T_p(M)_2$ | 169 | △ |
| 9 | A$_d$ | H$_T$ | A | 4 | $(A)_{\frac{1}{2}}H_T-A_d-H_T(A)_2$ | 149 | △ |
| 10 | A$_d$ | T$_p$ | A | 4 | $(A)_{\frac{1}{2}}T_p-A_d-T_p(A)_2$ | 149 | △ |
| 11 | P | T$_p$ | A | 4 | $(A)_{\frac{1}{2}}T_p-P-T_p(A)_2$ | 154 | △ |
| 12 | P$_m$ | D | A | 4 | $P_m(D-A)_4$ | 206 | X~△ |
| 13 | P$_m$ | T$_r$ | A | 4 | $P_m(T_r-A)_4$ | 250 | X~△ |
| 14 | T$_m$ | T$_r$ | A | 3 | $T_m(T_r-A)_3$ | 256 | △ |
| 15 | M$_t$ | G | M | 4 | $(M)_{\frac{1}{2}}G-M_t-G(M)_2$ | 134 | △ |
| 16 | A$_d$ | G | M | 4 | $(M)_{\frac{1}{2}}G-A_d-G(M)_2$ | 142 | X~△ |
| 17 | P | G | M | 4 | $(M)_{\frac{1}{2}}G-P-G(M)_2$ | 147 | X~△ |
| 18 | P | P$_e$ | M | 6 | $(M)_{\frac{1}{3}}P-P-P_e(M)_3$ | 135 | △ |
| 19 | T$_m$ | E | M | 3 | $T_m(E-M)_3$ | 182 | △ |
| 20 | T$_m$ | D | M | 3 | $T_m(D-M)_3$ | 226 | △ |
| 21 | P$_m$ | E | M | 4 | $P_m(E-M)_4$ | 176 | X~△ |
| 22 | T | E | A | 2 | $A(E-T)_nE-A$ (Average:n=1) | 183 | X~△ |
| 23 | T | D | A | 2 | $A(D-T)_nD-A$ (Average:n=1) | 227 | △ |
| 24 | T | D | A | 2 | " Average:n=2 | 295 | △ |
| 25 | T | D | A | 2 | " (Average:n=5) | 707 | △ |
| 26 | T | T$_r$ | A | 2 | $A(T_r-T)_nT_r-A$ (Average:n=1) | 271 | △ |
| 27 | T | P$_r$ | A | 2 | $A(Pr-T)_nPr-A$ (Average:n=2) | 302 | △ |
| 28 | T | D$_p$ | A | 2 | $A(D_p-T)_nD_p-A$ (Average:n=1) | 239 | △ |
| 29 | T | N | A | 2 | $A(N-T)_nN-A$ (Average:n=1) | 225 | X~△ |
| 30 | T | B | A | 2 | $A(B-T)_nB-A$ (Average:n=1) | 211 | X~△ |

Table 1-continued

| Preparation No. | Polybasic acid | Polyhydric alcohol | Terminal group | Number of terminal group | Structure of principal ingredient (standard compound) | (Meth)acryloyl group equivalent | State of cure obtained by electron ray irradiation |
|---|---|---|---|---|---|---|---|
| 31 | T | E | M | 2 | M⊢E—T⊣$_n$E—M (Average:n=1) | 197 | Δ |
| 32 | T | D | M | 2 | M⊢D—T⊣$_n$D—M (Average:n=2) | 361 | Δ |
| 33 | T | P | M | 2 | M⊢P$_r$—T⊣$_n$P$_r$—M (Average:n=2) | 316 | Δ |
| 34 | T | D$_p$ | M | 2 | M⊢D$_p$—T⊣$_n$D$_p$—M (Average:n=1) | 253 | Δ |
| 35 | H$_t$ | D | A | 2 | A⊢D—H$_t$⊣$_n$D—A (Average:n=1) | 233 | X~Δ |
| 36 | H$_t$ | D | M | 2 | M⊢D—H$_t$⊣$_n$D—M (Average:n=1) | 247 | Δ |
| 37 | T | E | A | 1 | A—E—T—OH | 268 | Δ |
| 38 | T | P$_r$ | A | 1 | A—P—T—OH | 282 | Δ |
| 39 | T | E | M | 1 | M—E—T—OH | 282 | X~Δ |
| 40 | T | P$_r$ | A | 1 | A⊢P$_r$'⊣$_l$O—T⊣$_m$⊢P$_r$'⊣$_n$OH* | 322 | Δ |
| 41 | P | E | A | 2 | A⊢E—P⊣$_n$E—A (Average:n=1) | 181 | Δ |
| 42 | P | D | A | 2 | A⊢D—P⊣$_n$D—A (Average:n=1) | 225 | X~Δ |
| 43 | P | D$_p$ | A | 2 | A⊢D$_p$—P⊣$_n$D—A (Average:n=1) | 237 | X~Δ |
| 44 | P | T$_r$ | A | 2 | A⊢T$_r$—P⊣$_n$T$_r$—A (Average:n=1) | 269 | Δ |
| 45 | P | P$_r$ | A | 2 | A⊢P$_r$—P⊣$_n$P$_r$—A (Average:n=2) | 298 | Δ |
| 46 | P | B$_p$ | M | 2 | M⊢B$_p$—P⊣$_n$B—M (Average:n=1) | 477 | Δ |
| 47 | M$_l$ | D | A | 2 | A⊢D—M$_l$⊣$_n$D—A (Average:n=1) | 200 | Δ |
| 48 | M$_l$ | N | A | 2 | A⊢N—M$_l$⊣$_n$N—A (Average:n=1) | 198 | Δ |
| 49 | M$_l$ | P$_r$ | M | 2 | M⊢P$_r$—M$_l$⊣$_n$P$_r$—M (Average:n=1) | 184 | Δ |
| 50 | F | H | A | 2 | A⊢H—F⊣$_n$H—A (Average:n=1) | 212 | Δ |
| 51 | F | B | A | 2 | A⊢B—F⊣$_n$B—A (Average:n=1) | 184 | Δ |
| 52 | I | D | M | 2 | M⊢D—I⊣$_n$D—M (Average:n=1) | 184 | Δ |
| 53 | S | E | M | 2 | M⊢E—S⊣$_n$E—M (Average:n=1) | 171 | Δ |
| 54 | SB$_r$ | D | A | 2 | A⊢D—SB$_r$⊣$_n$D—A (Average:n=1) | 241 | Δ |
| 55 | S$_e$ | D | M | 2 | M⊢D—S$_e$⊣$_n$D—M (Average:n=1) | 257 | X |
| 56 | P$_{cl}$ | D | A | 2 | A⊢D—P$_{cl}$⊣$_n$D—A (Average:n=1) | 294 | X~Δ |
| 57 | P$_{cl}$ | D | M | 2 | M⊢D—P$_{cl}$⊣$_n$D—M (Average:n=1) | 308 | X~Δ |
| 58 | PB$_r$ | E | A | 2 | A⊢E—PB$_r$⊣$_n$E—A (Average:n=1) | 339 | Δ |
| 59 | G$_m$ | D | M | 2 | M⊢D—G$_m$⊣$_n$D—M (Average:n=1) | 228 | Δ |
| 60 | A$_d$ | D | A | 2 | A⊢D—A$_d$⊣$_n$D—A (Average:n=1) | 215 | X |
| 61 | A$_d$ | D | M | 2 | M⊢D—A$_d$⊣$_n$D—M (Average:n=1) | 229 | X~Δ |
| 62 | M$_l$ | E | A | 1 | A—E—M$_l$—OH | 214 | Δ |
| 63 | S | E | A | 1 | A—E—S—OH | 216 | Δ |
| 64 | P | P$_r$ | A | 1 | A—P$_r$—P—OH | 278 | Δ |

Remarks: State of cure obtained by electron ray irradiation (at a dosage of 5 megarad)
○ Complete cure
Δ Incomplete cure with tackiness remaining on surface portions in contact with the air
X No or little cure
Note: *: l and n ore each 1-2, and m is 1-3.

The cyclohexene nucleus-containing oligoacrylates according to this invention should have a boiling point of not lower than 200° C, preferably 250° C and more preferably 300° C, and they are represented by the following general formula [I]

$(CH_2=CH-CO)_n X$      [I]

where n is an integer of from 3 to 6 and X is represented by the following general formula [II]

      [II]

which indicates the residue of an organic group containing at least one cyclohexene nucleus, such as a polyester, polyether, polyurethane or polyamide, or indicates the residue of a combination of these polymers, such as a polyetherpolyester or polyesterpolyurethane. The prefix "poly" used herein is defined to mean not only "many (two or more)" but also "one". The cyclohexene nucleus-containing oligoacrylates have an acryloyl group equivalent of not exceeding 1000, and the lower limit of the equivalent is necessarily determined depending on the property or boiling point of the oligoacrylate required, that is, depending on the kind of the oligoacrylate. It is a general tendency that the smaller the acryloyl group equivalent is, the lower the boiling point is. The oligoacrylates of the general formula [I] wherein $n$ is two or less, will not be cured under the action of ionizing radiant rays in the air. Oligoacrylates of the formula [I] wherein $n$ is 7 or more, may also be synthesized by the suitable selection of raw materials and synthesizing process used and, however, if $n$ takes an excessively high numeral value, the synthesis will be accompanied with cyclization condensation and polymerization whereby it is likely to obtain oligoacrylates which have gelled and consequentially become unsuitable for use in the practice of this invention. The symbol X mentioned above may contain various functional groups such as hydroxyl and carboxyl groups, or unsaturated bond-containing functional groups such as methacryloyl group, allyl group and maleic acid residue. Materials for introducing cyclohexene nuclei to the oligoacrylates to be synthesized, include cyclohexenemonocarboxylic acid, cyclohexenedicarboxylic acid, cyclohexenetricarboxylic acid, 6-methyl-cyclohexene-4-1,2,3-tricarboxylic acid, himic acid (endo-5-norbornene-2,3-dicarboxylic acid), endo acid (7,7-dimethyl-5-norbornene-2,3-dicarboxylic acid), cyclohexenol, cyclohexenediol, and halogen-substituted compounds thereof such as het acid (1,4,5,6,7,7-hexachloro-endo-5-norbornene-2,3-dicarboxylic acid), mono- and polychlorotetrahydrophthalic acid and mono- and polybromotetrahydrophthalic acid, which compounds are all conveniently usuable. Anhydrides, esters, amides and the like of the above-mentioned polybasic acids are also usable.

In order to effect synthesis of the cyclohexene nucleus-containing oligoacrylates, there can be utilized known processes wherein acrylic acid, its esters or chloride and the above-mentioned cyclohexene nucleus-containing compound are used as the principal raw materials, and polybasic acids or their anhydrides, polyhydric alcohols, polyisocyanates, polyepoxides and the like are used as the accessory raw materials. More particularly, there may be used the usual esterifying reaction, the reaction with polyisocyanate and other processes as described in U.S. Pat. Nos. 3,455,801, 3,455,802, 3,470,079, 3,471,386 and 3,567,494; A. A. Berlin et al., "Polyesteracrylate," Nauka, Moscow (1967); "Hannobetsu Jitsuyoshokubai (Practical Catalyst for Particular Reaction)," pp. 909 and 932 (1970), published by Kagaku Kogyo Co., Ltd., Japan; and the like.

The accessory materials for use in the synthesis of the oligoacrylates include, for instance, polycarboxylic acids such as phthalic isophthalic, terephthalic, tetrachlorophthalic, tetrabromophthalic, hexahydrophthalic, oxalic, malonic, succinic, maleic, fumaric, glutaric, adipic, sebacic, dodecinylsuccinic, dodecanedioic acid, trimethyladipic, polybutadienedicarboxylic, aconic, butanetricarboxylic, butenetricarboxylic, trimellitic, pyromellitic and butanetetracarboxylic acids, and the anhydrides thereof; polyhydric alcohols such as ethylene glycol, propylene glycol, butanediol, hexanediol, neopentyl glycol, hydrogenated bisphenol A, cyclohexane-1,4-dimethanol, m-xylidene glycol, diethanolamine, dibromoneopentyl glycol, trimethylpentanediol, hexylene glycol, polybutadienediol, glycerine, trimethylolpropane, trimethylolethane, hexanetriol, pentaerythritol, sorbitol, erythritol; polyether-type polyhydric alcohols such as diethylene glycol, triethylene glycol, polyethylene glycol, dipropylene glycol, polypropylene glycol, glycerine tri(polyethylene glycol)ether, bisphenoldioxyethylether, bisphenoldioxypropylether and diglycerine; polythiol-type polyhydric alcohols; polysiloxane-type polyhydric alcohols; monoepoxides such as ethylene oxide, propylene oxide, styrene oxide, butylglycidyl ether, epicholorohydrin, methylepichlorohydrin, butadiene monoxide, (meta)allylglycidyl ether and 3-hydroxypropylene oxide; polyepoxides as described in said "Practical Catalyst for Particular Reaction," p. 910, and "Kogyo Zairyo (Materials for Industrial Use)," 18–5, p. 11 (1970), published by Nikkan Kogyo Shinbun Co., Ltd. Japan; and polyisocyanates as described in said "Practical Catalyst for Particular Reaction," p. 933.

The previously mentioned principal or accessory starting materials may be used singly or may be used jointly in the form of a mixture of at least two thereof.

Thus, as concluded from the above-mentioned starting materials and said Table 1 and the following Table 3, the cyclohexene nucleus-containing oligoacrylates which may especially preferably be used in the practice of this invention are compounds which are in the form of an ester, prepared from acrylic acid and a polyol selected from the following polyol groups [A]and [B], or the modifications of said ester and which contain 3 – 6 acryloyl groups and at least one cyclohexene nucleus in the molecule, and an acryloyl group equivalent of not exceeding 1000.

POLYOLS [A]

Polyols of this group are those which have the skeleton of polyesters prepared from 4,5-unsaturated alicyclic dicarboxylic acids or a mixture thereof with dito trivalent carboxylic acids, and tri- to hexahydric alcohols or a mixture thereof with dihydric alcohols.

POLYOLS [B]

Polyols of this group are those which have the skeleton of polyesters prepared from 4,5-unsaturated alicyclic tricarboxylic acids or anhydrides thereof, or a mixture thereof with di- to tetracarboxylic acids or anhydrides thereof, and di- to hexahydric alcohols.

The cyclohexene nucleus-containing oligoacrylates according to this invention may easily be cured in the absence of a polymerization initiator under the action of ionizing radiant rays in the air. Thus they do not necessarily need the polymerization initiator and, however, they may be incorporated with heretofore frequently used peroxides, azo compounds, polymerization accelerators and initiators such as photoinitiators as described in "Kogyo Kagaku Zasshi (Journal of Industrial Chemistry)" 72, 31 (1969), Reports by Yasunori Nishijima and Masao Yamamoto.

It is recommendable that the cyclohexene nucleus-containing oligoacrylates or compositions comprising the same should contain a stabilizer in small amounts to prevent themselves from gelling during their storage thereby improving their pot life. Stabilizers which may be used include, for example, phenols such as hydroquinone, t-butylhydroquinone, catechol and t-butylactechol; quinones such as benzoquinone and diphenylbenzoquinone; phenothiazine and the derivatives thereof; and the salts of copper. Said oligoacrylates and compositions containing the same should preferably contain these stabilizers in amounts of from 0.0001 to 3% by weight. They may further be incorporated with not more than 70% by weight, preferably 50% by weight of at least one member selected from various materials and polymerizable compounds to uniformly dissolve said member therein or to obtain a non-uniform mixture of said member therewith, and the solution or mixture so obtained may then be cured.

In cases where the cyclohexene nucleus-containing oligoacrylates are to be incorporated with other oligo(meth)acrylates, diallylphthalate prepolymers or the like compounds which contain polymerizable functional groups but are, per se, not curable in the air, it is desirable that the amounts of these compounds added should be in the range of preferably not more than 100, more preferably 60 parts by weight per 100 parts by weight of the cyclohexene nucleus-containing oligoacrylate used. The incorporation of these additives in unduly large amounts will deteriorate the thus-obtained composition in curability in the air.

When adding polymers, which are solid at ambient temperatures, or pigments to the cyclohexene nucleus-containing oligoacrylate in large amounts, these additives will little affect the air-curability of the composition so obtained, while the use of said additives in excessively large amounts will allow the thus-obtained composition to increase in viscosity or become solid thereby making it inconvenient to handle the composition. Thus, such polymers or pigments should be added to the oligoacrylate in amounts not more than that of the oligoacrylate. The use of other various additives in too large amounts also is undesirable since it will cause the composition so obtained to be less curable in the air and less convenient in handling and it will give a cured product having decreased strength and hardness. Additives which may be used include, for example, the oligo(meth)acrylates Nos. 8 – 64 described in Table 1, as well as oligomers such as oligo(meth)acrylates containing 1 – 6 (meth)acryloyl groups in the molecule and butadiene oligomers; prepolymers such as diallylphthalate prepolymers; synthetic and natural polymers, copolymers and rubbers such as polyethylene, polypropylene, polystyrene, poly(meth)acrylate, polyvinyl chloride, polybutadiene and cellulose; plasticizers such as dioctylphthalate and soybean oil; oils and fats; viscosity controller agent; pigments and inorganic fillers such as glass, titanium oxide, silica, barite and calcium carbonate, dyes for coloring, and stabilizers and anti-corrosive agents for enhancing the weather-proof and corrosion resistant properties. Other additives which may be used include (meth)acrylic acid and their lower alkyl esters, styrene, acrylonitrile, other vinylic monomers and solvents. Among these additives, those having a boiling point of 200° C or lower at the normal pressure should be used in small amounts, usually in amounts of up to 10% by weight, while the use of them in large amounts will raise such problems as above since they will evaporate during the curing step.

The ionizing radiant rays used in the practice of this invention have an energy of at least 100 Kev and mean accelerated particles and electromagnetic waves which when absorbed in a substance will emit accelerated particles and electromagnetic waves thereby causing ionization of the substance.

The ionizing radiant rays which may be used include electron rays accelerated by accelerators such as Cockcroft's type accelerators, Van de Graaf's type accelerators, linear accelerators, betatrons and cyclotrons and further include $\gamma$ rays emitted from radioisotopes and atomic piles and the like, X rays, $\alpha$ rays, $\beta$ rays, neutron beam and proton beam.

According to this invention, desired cured products can be easily obtained under the action of ionizing radiant rays in the air, the curing step is greatly simplified and the desired cured products thus obtained are advantageous in that they are excellent in heat resistance due to their cross-linked structure. Thus they find many uses in various fields as a coating material and surfacing agent for metals, plastics, glass, lumber, paper, fibers, rubber and other materials, a vehecle for printing inks, a binder, a plastic combination materials such as F.R.P. and W.P.C., and a molding material and they may further be used in the manufacture of laminates and castings.

In addition, the cyclohexene nucleus-containing oligoacrylates according to this invention can practically wholly be cured since they contain little or no volatile matter which will raise various troublesome problems when cured.

Now, syntheses of various oligo(meth)acrylates are indicated in Reference Examples being described later. The structures of the chemical compounds obtained in the Reference Examples were deduced with reference to the analyses by gel permeation chromatography.

At this point, the structures of the oligo(meth) acrylates will be explained. As described later, they are prepared typically by esterification of the polycarboxylic acid and the polyhydric alcohol with the (meth)acrylic acid. Whatever synthesizing process may be employed, the product being obtained will not be a single compound but a mixture of various compounds. The particulars of the composition of such mixtures have gradually been somewhat elucidated and are now being elucidated. For example, Japanese Patent Gazette No. 11194/71 has disclosed that an oligomethacrylate prepared from phthalic acid, ethylene glycol and methacrylic acid in the molar ratio of 2.2 : 2 : 1 should theoretically be a compound having the general formula M $+$ E - P $\rightarrow_n$ E - M wherein the symbols M, E and P are as defined before and $n$ is 1 and, however, said compound is practically not a genuine one having the above formula wherein $n$ is 1 but a mixture of compounds having the formula wherein the average of the condensation degrees (n's) is 1. It is, however, not only troublesome but difficult to analyze such mixture of oligo(meth)acrylates in order to obtain from the mixture individual isolated oligo(meth)acrylate constituents for determining their accurate structural formula. Thus, as is seen from, for example, U.S. Pat. Nos. 3,455,801, 3,451,980 and 3,631,154 as well as Japanese Patent Gazettes 13546/72 and 23661/72, when such a composition (a mixture of oligo(meth)acrylates) to be cured as used in the process of this invention is attempted to be represented by its chemical name, chemical formula or structural formula, its averaged chemical formula is deduced from the formulae of chemical reactions considered to take place from the kinds and the molar ratio of starting materials used, and said composition or mixture of oligo(meth)acrylates has generally been represented by said deduced averaged chemical formula which shows a macroscopic theoretically inferred compound. Therefore, both the structural formula of a mixture of oligoacrylates according to this invention which contain 3 – 6 acryloyl groups and at least one cyclohexene nucleus in the molecule with the molecular weight per acryloyl group being not more than 1000, and the chemical formula of mixed oligo(meth)acrylates which was previously and will later be described in this specification are based on such theoretically inferred compound as above.

Examples of reaction formulae on which the averaged chemical formula is based are as follows.

described in Table 2 by the use of the following synthesizing processes or other processes similar thereto, respectively.

Synthesizing process — 1

Synthesis is carried out by adding phenothiazine to the (meth)acrylic acid in the amount of 0.03% by weight of the acid and then effecting esterification using sulphuric acid as the catalyst in toluene as the solvent.

SYNTHESIZING PROCESS — 2

Synthesis is carried out by adding phenothiazine to (meth)acrylic acid in the amount of 0.03% by weight of the acid and then effecting the reaction, using trimethylbenzylammoniumchloride as the catalyst, at 80° – 90° C for 5 – 8 hours.

SYNTHESIZING PROCESS — 3

A flask was charged with 1 mol of (meth)acrylic acid, 1 mol of a polybasic acid anhydride and 50 cc of toluene to form a mixture which was then incorporated with, as the catalysts, 0.03 mol of zinc chloride and phenothiazine in the amount of 0.03% by weight of the

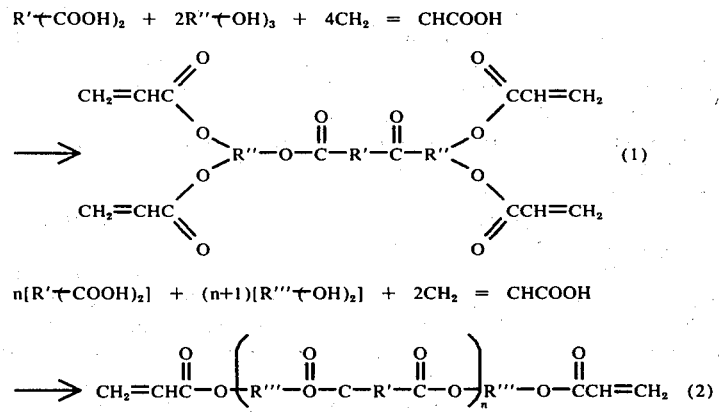

wherein $n$ is an integer of 1 or more.

The above formula (1) is for a case where a dicarboxylic acid [represented by $R' + COOH)_2$], a trihydric alcohol [represented by $R'' + OH)_3$] and acrylic acid are used as the starting materials, and the formula (2) is for a case where a dicarboxylic acid, a dihydric alcohol and acrylic acid are used as the starting materials. The symbols $R'$, $R''$ and $R'''$ used in the formulae are as previously defined with respect to Table 1.

REFERENCE EXAMPLE 1

The oligo(meth)acrylates shown in Table 1 are those which were synthesized from the starting materials (meth)acrylic acid. The whole mass so obtained was further incorporated with 1.7 mol of propylene oxide under agitation at 90° –100° C while adding the oxide slowly and dropwise and was then reacted with each other.

The synthesizing processes used and the approximate viscosities at ambient temperature of the oligo(meth)acrylates obtained thereby are indicated in the two most right columns of Table 2. In the column of the approximate viscosities, "Low" indicates 1000 cp or lower, "Medium" 1000 – 5000 cp and "High" 5000 cp or more. In said Synthesizing process — 1, the reaction solution is kept at its boiling point (about 110° C) for 7 – 8 hours.

Table 2

| Composition | Starting materials and amounts thereof in molar ratio | | | | | | Synthesizing process | Viscosity of oligomer |
|---|---|---|---|---|---|---|---|---|
| | Polybasic acid | Mol | Polyhydric alcohol | Mol | Source of terminal group | Mol | | |
| 1 | Tetrahydrophthalic anhydride | 1 | Trimethylolpropane | 2 | Acrylic acid | 4 | 1 | M |
| 2 | " | 1 | Glycerine | 2 | " | 4 | 1 | H |
| 3 | " | 1 | 1,2,6-hexanetriol | 2 | " | 4 | 1 | H |
| 4 | " | 1 | Pentaerithritol | 2 | " | 6 | 1 | H |
| 5 | Himic acid anhydride | 1 | Glycerine | 2 | " | 4 | 1 | H |
| 6 | Het acid | 1 | Trimethylolpropane | 2 | " | 4 | 1 | H |

Table 2-continued

| Composition | Polybasic acid | Mol | Polyhydric alcohol | Mol | Source of terminal group | Mol | Synthesizing process | Viscosity of oligomer |
|---|---|---|---|---|---|---|---|---|
| 7 | anhydride 6-methyl-cyclohexene-4-1,2,3-tricarboxylic anhydride | 1 | — | — | 2-hydroxyethyl-acrylate | 3 | 1 | M |
| 8 | Tetrahydrophthalic anhydride | 1 | Trimethylolpropane | 2 | Methacrylic acid | 4 | 1 | H |
| 9 | Adipic acid | 1 | 1,2,6-hexanetriol | 2 | Acrylic acid | 4 | 1 | H |
| 10 | '' | 1 | Trimethylolpropane | 2 | '' | 4 | 1 | M |
| 11 | Phthalic anhydride | 1 | '' | 2 | '' | 4 | 1 | H |
| 12 | Pyromellitic anhydride | 1 | Diethylene glycol | 4 | '' | 4 | 1 | M |
| 13 | '' | 1 | Triethylene glycol | 4 | '' | 4 | 1 | M |
| 14 | Trimellitic anhydride | 1 | '' | 3 | '' | 3 | 1 | H |
| 15 | Maleic anhydride | 1 | Glycerine | 2 | Methacrylic acid | 4 | 1 | L |
| 16 | Adipic acid | 1 | Glycerine | 2 | Methacrylic acid | 4 | 1 | H |
| 17 | Phthalic anhydride | 1 | '' | 2 | '' | 4 | 1 | H |
| 18 | '' | 1 | Pentaerithritol | 2 | '' | 6 | 1 | H |
| 19 | Trimellitic anhydride | 1 | — | — | 2-hydroxyethyl-methacrylate | 3 | 1 | M |
| 20 | '' | 1 | Ethylene glycol | 3 | Methacrylic acid | 3 | 1 | L |
| 21 | Pyromellitic anhydride | 1 | — | — | 2-hydroxyethyl-methacrylate | 4 | 1 | M |
| 22 | Tetrahydrophthalic anhydride | 1 | — | — | 2-hydroxyethyl-acrylate | 2 | 1 | L |
| 23 | '' | 1 | Diethylene glycol | 2 | Acrylic acid | 2 | 1 | L |
| 24 | Tetrahydrophthalic anhydride | 2 | Diethylene glycol | 3 | Acrylic acid | 2 | 1 | M |
| 25 | '' | 5 | '' | 6 | '' | 2 | 1 | H |
| 26 | '' | 1 | Triethylene glycol | 2 | '' | 2 | 1 | M |
| 27 | '' | 2 | Propylene glycol | 3 | '' | 2 | 1 | H |
| 28 | '' | 1 | Dipropylene glycol | 2 | '' | 2 | 1 | L |
| 29 | '' | 1 | Neopentyl glycol | 2 | '' | 2 | 1 | M |
| 30 | '' | 1 | 1,3-butanediol | 2 | '' | 2 | 1 | L |
| 31 | '' | 1 | — | — | 2-hydroxyethyl-methacrylate | 2 | 1 | L |
| 32 | '' | 2 | Diethylene glycol | 3 | Methacrylic acid | 2 | 1 | M |
| 33 | Tetrahydrophthalic anhydride | 2 | Propylene glycol | 3 | Methacrylic acid | 2 | 1 | H |
| 34 | '' | 1 | Dipropylene glycol | 2 | '' | 2 | 1 | L |
| 35 | Himic acid anhydride | 1 | Diethylene glycol | 2 | Acrylic acid | 2 | 1 | L |
| 36 | '' | 1 | '' | 2 | Methacrylic acid | 2 | 1 | L |
| 37 | Tetrahydrophthalic anhydride | 1 | — | — | 2-hydroxyethyl-acrylate | 1 | 2 | M |
| 38 | '' | 1 | — | — | 2-hydroxypropyl-acrylate | 1 | 2 | H |
| 39 | '' | 1 | — | — | 2-hydroxyethyl-methacrylate | 1 | 2 | H |
| 40 | Tetrahydrophthalic anhydride | 1 | Propylene oxide | 1.7 | Acrylic acid | 1 | 3 | M |
| 41 | Phthalic anhydride | 1 | — | — | 2-hydroxyethyl-acrylate | 2 | 1 | L |
| 42 | '' | 1 | Diethylene glycol | 2 | Acrylic acid | 2 | 1 | L |
| 43 | '' | 1 | Dipropylene glycol | 2 | '' | 2 | 1 | L |
| 44 | '' | 1 | Triethylene glycol | 2 | '' | 2 | 1 | L |
| 45 | '' | 2 | Propylene glycol | 2 | '' | 2 | 1 | H |
| 46 | '' | 1 | Dioxypropyl ether of bisphenol A | 2 | Methacrylic acid | 2 | 1 | H |
| 47 | Maleic anhydride | 1 | Diethylene glycol | 2 | Acrylic acid | 2 | 1 | L |
| 48 | Maleic anhydride | 1 | Neopentyl glycol | 2 | Acrylic acid | 2 | 1 | L |
| 49 | '' | 1 | Propylene glycol | 2 | Methacrylic acid | 2 | 1 | L |
| 50 | Fumaric acid | 1 | 1,6-hexanediol | 2 | Acrylic acid | 2 | 1 | L |
| 51 | '' | 1 | 1,3-butanediol | 2 | '' | 2 | 1 | L |
| 52 | Itaconic acid | 1 | Ethylene glycol | 2 | '' | 2 | 1 | L |
| 53 | Succinic anhydride | 1 | — | — | 2-hydroxyethyl-methacrylate | 2 | 1 | L |
| 54 | Bromosuccinic acid | 1 | Diethylene glycol | 2 | Acrylic acid | 2 | 1 | L |
| 55 | Sebacic acid | 1 | '' | 2 | Methacrylic acid | 2 | 1 | L |
| 56 | Tetrahydrophthalic anhydride | 1 | Diethylene glycol | 2 | Acrylic acid | 2 | 1 | L |
| 57 | Tetrahydrophthalic | 1 | Diethylene glycol | 2 | Methacrylic acid | 2 | 1 | L |

Table 2-continued

| Composition | Starting materials and amounts thereof in molar ratio | | | | | | Synthesizing process | Viscosity of oligomer |
|---|---|---|---|---|---|---|---|---|
| | Polybasic acid | Mol | Polyhydric alcohol | Mol | Source of terminal group | Mol | | |
| 58 | Tetrabromo-phthalic anhydride | 1 | — | — | 2-hydroxyethyl-acrylate | 2 | 1 | L |
| 59 | α-methylene-glutaric acid | 1 | Diethylene glycol | 2 | Methacrylic acid | 2 | 1 | L |
| 60 | Adipic acid | 1 | " | 2 | Acrylic acid | 2 | 1 | L |
| 61 | " | 1 | " | 2 | Methacrylic acid | 2 | 1 | L |
| 62 | Maleic anhydride | 1 | — | — | 2-hydroxyethyl-acrylate | 1 | 2 | L |
| 63 | Succinic anhydride | 1 | — | — | " | 1 | 2 | L |
| 64 | Phthalic acid | 1 | — | — | 2-hydroxypropyl-acrylate | 1 | 2 | L |

Remarks: (Viscosity)H : High M : Medium L : Low

REFERENCE EXAMPLE 2 using tetrahydrophthalic anhydride, glycerine, diethylene glycol and acrylic acid in the ratio of 3 : 1 : 3 : 3, synthesis was effected as follows.

The glycerine and the tetrahydrophthalic anhydride were reacted with each other in the presence of trimethylbenzylammonium chloride catalyst to give a reaction mixture which was then incorporated with the ethylene glycol, the acrylic acid and, as the polymerization inhibitor, phenothiazine in the amount of 0.03% by weight of the acrylic acid. The whole mass so obtained was subjected to esterification using sulphuric acid in toluene as the solvent. The product thus synthesized is a light-brown, transparent and highly viscous liquid having an acryloyl group equivalent of 325 and comprising, in admixture, a standard compound as the principal ingredient and other compounds similar thereto as mentioned before, the standard compound being represented by the following formula:

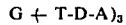

G + T-D-A)₃

REFERENCE EXAMPLE 3

The two-step procedure of Reference example 2 was followed, but using as the starting materials tetrahydrophthalic anhydride, pentaerithritol, diethylene glycol and acrylic acid in the molar ratio of 4 : 1 : 4 : 4.

The product so obtained is a light-brown, transparent, highly viscous liquid having an acryloyl group equivalent of 328 and comprising, in admixture, a standard compound as the principal ingredient and other compounds similar thereto as mentioned before, the standard compound being represented by the following formula:

Pe + T-D-A)₄

REFERENCE EXAMPLE 4

Synthesis was effected in two steps in the same manner as in Reference example 2 using, as the starting materials, Het acid anhydride, trimethylolpropane, diethylene glycol and acrylic acid in the molar ratio of 3 : 1 : 3 : 3.

The product so obtained is a light-brown, transparent and highly viscous liquid having an acryloyl group equivalent of 558 and comprising, in admixture, a standard compound as the principal ingredient and other compounds similar thereto as mentioned before, the standard compound being represented by the following formula:

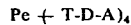

T_P + He-D-A)₃

REFERENCE EXAMPLE 5

Using tetrahydrophthalic anhydride, trimethylolpropane, diethylene glycol and acrylic acid in the molar ratio of 2 : 2 : 1 : 4, synthesis was effected as follows.

The tetrahydrophthalic anhydride and the diethylene glycol were firstly reacted with each other using trimethylbenzylammonium chloride as the catalyst to produce a reaction product which was then further incorporated with the trimethylolpropane and the acrylic acid and with phenothiazine in the amount of 0.03% by weight of the acrylic acid. The whole mass thus obtained was esterified using sulphuric acid as the catalyst in toluene as the solvent.

The product is a light-brown, transparent and highly viscous liquid having an acryloyl group equivalent of 215 and comprising, in admixture, a standard compound as the principal ingredient and other compounds similar thereto as mentioned before, the standard compound being represented by the following formula:

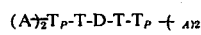

(A⅟₂T_P-T-D-T-T_P + A)₂

REFERENCE EXAMPLE 6

Using as the starting materials, tetrahydrophthalic anhydride, pentaerithritol, diethylene glycol and acrylic acid in the molar ratio of 2 : 2 : 1 : 6, synthesis was effected in the same manner as in Reference example 5.

The product so obtained is a light-brown, transparent and highly viscous liquid having an acryloyl group equivalent of 162 and comprising a standard compound as the main ingredient and other compounds similar thereto as mentioned before, the standard compound being represented by the following formula:

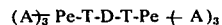

(A⅟₃ Pe-T-D-T-Pe + A)₃

REFERENCE EXAMPLE 7

One mol of glycidyl acrylate was incorporated with 0.5 mol of tetrahydrophthalic acid and then with phenothiazine in the amount of 0.03% by weight of the acrylic acid (used in producing the glycidyl acrylate) to form a mixture which was then reacted with each other in the presence of triethylamine as the catalyst, at 60° – 80° C while agitating under heat for 8 hours. Separately, 1 mol of 2-hydroxyethyl acrylate (containing 0.1% by weight of triethylamine and 0.03% by weight of phenothiazine) was added slowly and dropwise to one mol of tolylenediisocyanate to react them with each other thereby obtaining a reaction product. This reaction product was then slowly added to the reaction product of said glycidyl acrylate and tetrahydrophthalic acid, the latter reaction product having previously been incorporated with 0.1% by weight of triethylamine, at 60° – 70° C under agitation. The mixture of the two reaction products was reacted with each for synthesis while agitating for the subsequent 5 hours.

The final product so obtained is light-brown, transparent and highly viscous liquid having an acryloyl equivalent of 252 and comprising, in admixture, a standard compound as the main ingredient and other compounds similar thereto as mentioned before, the standard compound being represented by the following formula:

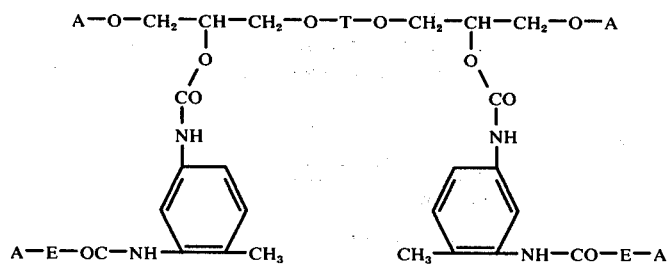

REFERENCE EXAMPLE 8

Using tetrahydrophthalic acid, trimethylolpropane, diethylene glycol and acrylic acid in the molar ratio of 3 : 1 : 3 : 3, synthesis was conducted in the same manner as in Reference example 1.

The product is a light-brown, highly viscous liquid having an acryloyl group equivalent of 339 and comprising, in admixture, compounds having, on the average, the following formula:

$$T_P + (T-D-A)_3$$

REFERENCE EXAMPLE 9

Using tetrahydrophthalic acid, trimethylolpropane, diethylene glycol and acrylic acid in the molar ratio of 6 : 1 : 6 : 3, synthesis was conducted in the same manner as in Reference example 8.

The product so obtained is a light-brown and highly viscous liquid having an acryloyl group equivalent of 579 and comprising, in admixture, compounds having, on the average, the following formula:

$$T_P + (T-D)_{\overline{n}} A]_3 \quad \text{(Average of n's is 2)}$$

REFERENCE EXAMPLE 10

Using tetrahydrophthalic acid, trimethylolpropane, diethylene glycol and acrylic acid in the molar ratio of 12 : 1 : 12 : 3, synthesis was effected in the same manner as in Reference example 8 to obtain as the product a light-brown, very highly viscous liquid which has an acryloyl group equivalent of 1059 and comprises, in admixture, compounds having, on the average, the following formula:

$$T_P + (T-D)_{\overline{n}} A]_3$$

REFERENCE EXAMPLE 11

Using tetrahydrophthalic acid, glycerine, diethylene glycol and acrylic acid in the molar ratio of 15 : 1 : 15 : 3, synthesis was conducted in the same manner as in Reference example 8.

The product so obtained is a light-brown and very highly viscous liquid having an acryloyl group equivalent of 1285 and comprising, in admixture, compounds having, on the average, the following formula:

$$G + (T-D)_{\overline{n}} A]_3 \quad \text{(Average of n's is 5)}$$

This invention will be better understood by the following non-limitative Examples.

EXAMPLES 1 – 15, AND COMPARISON EXAMPLES 1 – 2

The oligoacrylates indicated by Preparation Nos. 1 – 7 and obtained in Reference examples 2 – 11 were each thinly coated on on a 0.3 mm TFS (Tin-Free-Steel) sheet with a bar coater No. 12 to form a 30 – 50 μ thick coating on the sheet. The coating so obtained was then irradiated with electron rays accelerated by an electron ray accelerator having an output of 300 Kev, at a current intensity of 10 mA and at a dose of 5 megarad in the air.

The results obtained are shown in Table 3 wherein the symbols indicating the state of cure have the same meaning as those in Table 1.

Table 3

| No. | | Kind of oligo-(meth)acrylate | | (Meth)acryloyl group equivalent | State of cure | Appearance of cured coating |
|---|---|---|---|---|---|---|
| Example | 1 | Table 1 No. | 1 | 155 | ◯ | Hard, colorless, transparent |
| " | 2 | " | 2 | 135 | ◯ | Hard, light-yellow, transparent |
| " | 3 | " | 3 | 154 | ◯ | Hard, colorless, transparent |
| " | 4 | " | 4 | 122 | ◯ | " |
| " | 5 | " | 5 | 136 | ◯ | " |
| " | 6 | " | 6 | 209 | ◯ | Hard, light-brown, transparent |
| " | 7 | " | 7 | 174 | ◯ | Hard, colorless, transparent |
| " | 8 | Reference example | 2 | 325 | ◯ | " |
| " | 9 | " | 3 | 328 | ◯ | " |
| " | 10 | " | 4 | 558 | ◯ | Hard, light-brown, transparent |
| " | 11 | " | 5 | 215 | ◯ | Hard, colorless, transparent |
| " | 12 | " | 6 | 162 | ◯ | " |
| Example | 13 | Reference example | 7 | 252 | ◯ | Hard, light-brown, transparent |

Table 3-continued

| No. | | Kind of oligo-(meth)acrylate | (Meth)acryloyl group equivalent | State of cure | Appearance of cured coating |
|---|---|---|---|---|---|
| " | 14 | " 8 | 339 | ◯ | Hard, colorless, transparent |
| " | 15 | " 9 | 579 | ◯ | Somewhat soft, colorless, transparent |
| Comparison example | 1 | " 10 | 1051 | Δ | Tacky on surface, colorless, transparent |
| " | 2 | " 11 | 1285 | Δ | " |

EXAMPLES 16 – 22

The oligoacrylates indicated by Preparations Nos. 1 and 2 or obtained in Reference example 2 were incorporated with the additives in the amounts described in the nearly central column of Table 4 and then thoroughly mixed together. Then, electron rays were irradiated upon the thus-obtained mixture at a dosage of 5 megarad in the air in the same manner as in Examples 1 – 15.

The results are shown in the most right column of Table 4 which indicates that the perfectly cured coatings were obtained.

Table 4

| Example No. | Kind and amount of oligoacrylate used | Kind and amount of additive used | Appearance of coating formed |
|---|---|---|---|
| 16 | Table 1 No. 1 (100 parts by weight) | Powdered titanium dioxide (20 parts by weight) | Hard, white |
| 17 | Table 1 No. 1 (100 parts by weight) | Rose, Bengale (2 parts by weight) | Hard, red, transparent |
| 18 | Table 1 No. 1 (100 parts by weight) | 2,5-dimethyl-3-hexyl-2,5-diol (10 parts by weight) | Hard, colorless, transparent |
| 19 | Table 1 No. 1 (100 parts by weight) | Polyacrylate * (5 parts by weight) | " |
| 20 | Table 1 No. 2 (50 parts by weight) | Table 1 No. 31 (50 parts by weight) | " |
| 21 | Table 1 No. 2 (75 parts by weight) | Table 1 No. 42 (25 parts by weight) | " |
| 22 | Example 2 (100 parts by weight) | Diallylphthalate polymer (5 parts by weight) | " |

Note:
* Polyacrylate supplied under the trade name "Aron S-2040" by Toagosei Chemical Industrial Co., Ltd.

What is claimed is:

1. A process for the preparation of a cured oligoacrylate which comprises curing, under the action of ionizing radiation having energy of at least 100 Kev in a molecular oxygen-containing gas, an oligoacrylate containing a) 3–6 acryloyl groups; b) at least one cyclohexene nucleus in the molecule; c) an acryloyl group equivalent of not more than 1000; and d) having a boiling point of not lower than 200° C which oligoacrylate is a reaction product prepared by interesterifying a mixture of:
   1. acrylic acid;
   2. at least one member selected from the group consisting of tetrahydrophthalic acid and anhydride thereof, and
   3. at least one member selected from the group consisting of trimethylolpropane and pentaerythritol and then recovering said cured oligoacrylate.

2. A process as in claim 1, wherein the curing of the oligoacrylate takes place in the presence of at least one vinylic monomer.

* * * * *